United States Patent Office 2,760,937
Patented Aug. 28, 1956

2,760,937

PHOSPHORUS-CONTAINING LUBRICANT ADDITIVES

John P. McDermott, Springfield, N. J., assignor to Esso Research and Engineering Company, a corporation of Delaware No Drawing. Application October 31, 1951,
Serial No. 254,203

7 Claims. (Cl. 252—46.7)

The present invention relates to the preparation of phosphorus-containing compounds. It also relates to their use as additives for improving various characteristics of organic materials such as lubricants.

In accordance with the present invention, a new class of organic chemical compounds containing phosphorus, sulfur and chlorine has been discovered. These compounds impart useful properties to highly refined lubricating oils, fuels and the like when added in minor proportions. They are particularly useful in inhibiting oxidation and sludge formation in hydrocarbon products and in reducing corrosion of metal bearings in internal combustion engines using oils containing them. In addition, the compounds act as load bearing agents for oils and greases used in extreme pressure service.

The compounds of the present invention have the following general formula:

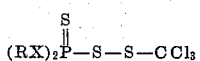

$$(RX)_2\overset{\overset{S}{\|}}{P}-S-S-CCl_3$$

wherein R and X have meanings defined below. The compounds are conveniently prepared by reacting perchloromethylmercaptan, $Cl_3$—SCl, with diorganodithiophosphoric acids or their cation derivatives. The reaction is mildly exothermic and is generally conducted at normal or slightly elevated temperatures. The reactants may be employed in equal molar proportions, since this is the ratio involved in the reaction. Other ratios may be used, and unreacted material may remain as a diluent of the reaction product or be removed by convenient means.

The diorganodithiophosphoric acids and cation derivatives are preferably dihydrocarbon ester or dihydrocarbon thioester derivatives having the general formula:

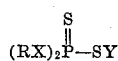

$$(RX)_2\overset{\overset{S}{\|}}{P}-SY$$

wherein R represents a hydrocarbon radical, such as alkyl, alkenyl, cycloalkyl, aryl, aralkyl or alkaryl radicals. X represents either oxygen or sulfur, oxygen being preferred. Y represents hydrogen or a cation; however, cation derivatives are preferred for obtaining a cleaner reaction. The cation is preferably a metal equivalent of hydrogen such as a reactive alkali or alkaline earth metal including sodium, potassium, barium, calcium and the like. Y may also be an ammonium or amine radical.

The R radicals may have up to about 30 carbon atoms although less than about 20 carbons will generally be preferred. Hydrocarbon radicals having as few as 1 carbon atom may be used, but those with above 2 to 3 carbon atoms will be preferred to obtain products of greater solubility in oils and the like. Specific hydrocarbon radicals include methyl, propyl, dodecyl, decenyl, lauryl, stearyl, and other straight and branched chain alkyl and alkenyl radicals as well as phenyl, naphthyl, benzyl, ethylphenyl, cyclohexyl, ethylcyclohexyl, and the like. Aliphatic hydrocarbon radicals are generally more desirable than the aromatic derivatives; acids containing alkyl radicals, for example, react more cleanly than acids having phenyl radicals. Alkyl derivatives are usually best for making compounds having good anti-oxidant properties.

The organo substituted dithiophosphoric acids may be prepared by well known means such as by reacting alcohols, mercaptans, phenols and thiophenols with phosphorus pentasulfide. Those prepared from alcohols and phenols are preferred. Specific acids include di-(methylcyclohexyl) dithiophosphoric acid, dicetyldithiophosphoric acid, di(methylphenyl) dithiophosphoric acid, di(2-ethylhexyl mercapto) dithiophosphoric acid, di(isobutyl mercapto) dithiophosphoric acid, and the like.

The reaction proceeds substantially in accordance with the following equation:

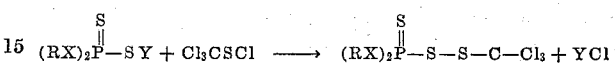

$$(RX)_2\overset{\overset{S}{\|}}{P}-SY + Cl_3CSCl \longrightarrow (RX)_2\overset{\overset{S}{\|}}{P}-S-S-C-Cl_3 + YCl$$

The trichloromethylmercapto radical replaces the active hydrogen or cation radical of the acid. The perchloromethyl mercaptan may be added slowly to the cation derivative of the acid, and the reactants may then be heated together for a time in the range of about 0.5 to 4 hours or so to obtain complete reaction. Reaction temperatures in the range of about 20° to 100° C. are generally used. It is convenient to conduct the reaction in the presence of an inert solvent in which the halide reaction by-products are insoluble or from which such by-products may be readily removed. Such solvents include petroleum ether, methyl alcohol, ethyl alcohol, acetone, dioxane, and the like. The heating step may be carried out under refluxing conditions when a solvent is used. When using a metal salt of an acid, the resulting metal halide will precipitate out of solution and may be removed by filtration, decantation or other means. Solvent may be removed from the finished product by stripping with nitrogen or by other means. The product may be filtered, usually before the solvent is removed, through a diatomaceous earth filter aid or the like to purify it.

The resulting product is conveniently stored and shipped in the form of a concentrate in a lubricating base oil, particularly when it is to be used as a lubricant additive. The amount of the product in the concentrate may vary in the range of about 20 to 50% or higher, based on the total composition, depending on its solubility in the base oil.

The product of the present invention is used in concentrations in the range of about 0.01 to 20.0% by weight, based on the total composition in lubricants, greases, etc. The range of about 0.01 to 5.0 or 10.0%, preferably about 0.1 to 2.0%, will usually be adequate for imparting oxidation and corrosion inhibiting properties to the oil. In the range of 5 to 8% up to about 20.0% of active ingredient will be preferred for gear oils or the like used in extreme pressure service.

Lubricant base stocks having viscosities in the range of about 35 to 150 S. S. U. (Saybolt Seconds Universal) at 210° F., for example, may be used. These stocks may be derived from conventionally refined petroleum distillates and residuals, from synthetic processes such as olefin polymerization, hydrogenation of coal, etc. Polyether and polyester synthetic lubricants, alone or in combination with other lubricants, may also be inhibited by these compounds. The lubricant compositions may, of course, include other additives such as pour point depressants, thickeners, viscosity index improvers, oiliness agents, and the like.

The products of the present invention may also be used in other mineral oil products such as motor fuels, heating oils, diesel fuels, hydraulic fluids, cutting oils, turbine oils, transformer oils, etc.

The invention will be more fully understood by reference to the following examples:

EXAMPLE I.—PREPARATION OF PRODUCTS

Product A

A one liter, 3-necked flask equipped with a stirrer, thermometer, and reflux condenser was charged with 25.2 grams (0.1 mol) of potassium diisopropyl dithiophosphate and 250 ml. of petroleum ether at room temperature. 18.6 grams (0.1 mol) of perchloromethyl mercaptan was added over a period of 40 minutes to the above rapidly stirred suspension. A 12° C. rise in reaction temperature was observed. The reactants were refluxed at 50° C. for three hours, the crystalline potassium chloride (KCl) was removed by filtration, and the filtrate was placed on a steam bath to remove solvent. The resulting light yellow liquid, comprising largely trichloromethylmercaptodiisopropyl dithiophosphate, analyzed 8.3 weight percent phosphorus, 26.8 weight percent sulfur, and 28.8 weight percent chlorine.

Product B

This product was prepared in accordance with the procedure used in making Product A using 54.4 grams (0.1 mol) of potassium di-(octylphenyl) dithiophosphate and 18.6 grams (0.1 mol) of perchloromethylmercaptan. The resulting viscous brown liquid, comprising trichloromethylmercapto di-(octylphenyl) dithiophosphate, analyzed 3.7% phosphorus, 9.3% sulfur and 9.5% chlorine.

Product C

This product was also prepared by the method used for preparing Product A using 26.1 grams (0.15 mol) of potassium di(methylcyclohexyl) dithiophosphate and 27.9 grams (0.15 mol) of perchloromethylmercaptan. The resulting viscous, light red liquid, comprising largely trichloromethylmercapto - di(methylcyclohexyl) dithiophosphate, analyzed 5.3% phosphorus, 21.7% sulfur and 21.1% chlorine.

EXAMPLE II.—LABORATORY BEARING CORROSION TEST

Blends were prepared containing 0.25 weight percent of the active ingredient of the above products in a base oil comprising a solvent extracted, Mid-Continent paraffinic oil of S. A. E. 20 grade. These blends and a sample of the base oil per se were submitted to a laboratory test designed to measure the effectiveness of the additive in inhibiting the corrosiveness of a typical mineral lubricant towards the surfaces of copper-lead bearings. The test was conducted substantially in accordance with that described in Example 12 of U. S. 2,529,303, issued in the name of John P. McDermott on November 7, 1950. The results are given in the following table as "corrosion life," which indicates the number of hours required for the bearings to lose 100 milligrams in weight, determined by interpolating the data obtained in various 4-hour run periods:

| Product Used in Oil Blend | Bearing Corrosion Life (Hours) |
| --- | --- |
| None | 8 |
| A | 56 |
| B | 20 |
| C | 48 |

The alkyl and cycloaliphatic derivatives demonstrated greater effectiveness than alkaryl derivatives in this test.

EXAMPLE III.—LAUSON ENGINE TEST

Product A was tested in a Lauson engine using 0.25 weight percent of active ingredient in an S. A. E. 30 grade lubricant comprising a solvent extracted naphthenic oil. The unblended oil was also tested. The test was conducted for a period of 20 hours using substantially the procedure described in Example 13 of the aforementioned patent, U. S. 2,529,303. The loss in weight of the copper-lead bearings were determined.

| Product Used in Oil Blend | Copper-Lead Bearing Weight Loss (Milligrams Per Bearing) |
| --- | --- |
| None | 250 |
| A | 20 |

The above products also gave satisfactory ratings in the copper strip corrosion test. It is seen that even very low concentrations of the compounds of the present invention are very effective in reducing the corrosive and oxidative tendencies of lubricants.

What is claimed is:

1. A lubricant composition comprising a major proportion of a mineral lubricating oil having a viscosity in the range of about 35 to 150 SSU at 210° F. and about 0.01 to 20.0% by weight, based on total composition, of a compound having the formula

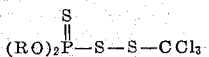

wherein R is a hydrocarbon radical having in the range of 2 to 20 carbon atoms.

2. A composition as in claim 1 wherein R is an isopropyl radical.

3. A composition as in claim 1 wherein R is an octylphenyl radical.

4. A composition as in claim 1 wherein R is a methylcyclohexyl radical.

5. A lubricant composition comprising a major proportion of a lubricating oil having a viscosity in the range of about 35 to 150 SSU at 210° F. and about 0.01 to 20.0% by weight, based on total composition, of a compound having the formula

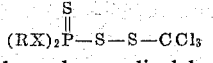

wherein R is a hydrocarbon radical having in the range of 2 to 20 carbon atoms and X is selected from the group consisting of oxygen and sulfur.

6. A concentrate consisting essentially of a lubricating oil having a viscosity in the range of about 35 to 150 SSU at 210° F. and in the range of about 20 to 50% by weight, based on the concentrate, of a compound having the formula

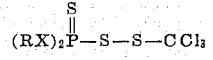

wherein R is a hydrocarbon radical having in the range of 2 to 20 carbon atoms and X is selected from the group consisting of oxygen and sulfur.

7. A concentrate consisting essentially of a mineral lubricating oil having a viscosity in the range of about 35 to 150 SSU at 210° F. and in the range of about 20 to 50% by weight, based on the concentrate, of a compound having the formula

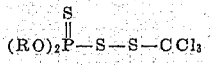

wherein R is a hydrocarbon radical having in the range of 2 to 20 carbon atoms.

References Cited in the file of this patent

UNITED STATES PATENTS

| | | |
| --- | --- | --- |
| 2,335,953 | McCracken et al. | Dec. 7, 1943 |
| 2,372,358 | Cook et al. | Mar. 27, 1945 |
| 2,389,718 | Davis | Nov. 27, 1945 |
| 2,529,304 | Mikeska et al. | Nov. 7, 1950 |
| 2,531,129 | Hook et al. | Nov. 21, 1950 |
| 2,545,158 | McDermott | Mar. 13, 1951 |

FOREIGN PATENTS

| | | |
| --- | --- | --- |
| 646,188 | Great Britain | Nov. 15, 1950 |